Patented Feb. 2, 1954

2,668,169

UNITED STATES PATENT OFFICE 2,668,169

METHOD OF MAKING NONSWELLING STARCH GRANULES WITH DIISOCYANATES

Ivan A. Wolff and Paul R. Watson, Peoria, Ill., assignors to the United States of America as represented by the Secretary of Agriculture No Drawing. Application March 30, 1951, Serial No. 218,515

8 Claims. (Cl. 260—233.3)

(Granted under Title 35, U. S. Code (1952), sec. 266)

The invention herein described may be manufactured and used by or for the Government of the United States of America for governmental purposes throughout the world without the payment to us of any royalty thereon.

This invention relates to the modification of starch to produce a swell-resistant product. It relates, more particularly, to an inexpensive and easy method for producing a non-swelling starch product in aqueous media.

Non-swelling or swell-resistant starch products are known in the art and possess valuable properties which make them useful for many purposes, such as organic filling material for paints, plastics and the like, as inert carriers for insecticides and as inert organic dusting powders. Heretofore, however, genuinely non-swelling or swell-resistant starches have been made by relatively expensive processes so that the cost of the product is prohibitive for many purposes. We have discovered a method whereby starch granules resistant to swelling may be prepared in aqueous suspension by surprisingly cheap and easily controlled methods.

According to our invention, any of the natural starches, such as corn starch, potato starch, rice starch, and the like, are treated with organic diisocyanates in aqueous suspension. In general, the reaction is carried out by first suspending the starch granules in water and then adding the diisocyanate, the reaction being allowed to continue to completion, whereupon the reacted starch is separated from the aqueous medium and dried.

The diisocyanates used in our process may be aromatic diisocyanates, such as benzene diisocyanate, toluene 2,4-diisocyanate, and the like, or aliphatic diisocyanates, such as tetramethylene diisocyanate, hexamethylene diisocyanate, and the like.

The process may be carried out within the range of about 5° C. up to the boiling point of the aqueous medium. Within this range 15° C. to 50° C. gives excellent results and is preferred for reasons of convenience. The time of reaction may vary from a few minutes up to several hours. We have obtained good results with only five minutes of reaction time, but employ longer times merely to insure sufficient time for the reaction to be complete. It is also preferred to insure continuing contact between the aqueous reagent medium and the solid phase starch granules by stirring. The amount of water employed in making the starch may vary from the minimum amount for easy stirring (i. e., about equal parts by weight for water and starch) up to ten or more times the weight of the starch.

The hydrogen ion concentration of the medium appears to have some effect on the swell resistance of the product. We have found that almost any pH will give a substantial degree of swell resistance to the starch, but that the alkaline side, especially between pH 8–11, is preferred. The pH may be adjusted to the preferred range by the addition of a soluble alkaline agent, such as sodium hydroxide, sodium carbonate, potassium hydroxide, ammonium hydroxide, and the like. Our experiments show that slightly better results are obtained when the pH is adjusted to lie within our preferred range at the beginning of the reaction and is maintained within that range during the reaction. This may be accomplished by the periodic addition of the soluble alkaline material.

The amount of diisocyanate added may vary from 0.1 to 1.0 percent based on the weight of the starch. Above this proportion increasing amounts of reagent do not seem to increase the swell resistance of the starch, although excess of the reagent does not appear to be detrimental. For reasons of convenience and economy we prefer to use from 0.1 to 1.0 percent of reagent based on the weight of the starch.

The starches employed in our process may be any of the naturally occurring starches, such as those of the cereal grains, roots, tubers, etc. It is also applicable to starches which have been treated physically in the various known refining steps, such as defatting and the like. Typical starches are wheat starch, corn starch, rice starch, defatted corn starch, potato starch, and the like. All these, in their unmodified condition, swell and form pastes in hot water. Their pasting propensities vary somewhat with the individual starch, but in contrast, the products produced by our process are markedly resistant to swelling, pasting and gelling.

The mechanism of the reaction involved in our process is not completely understood. Our tests show, however, that the conversion into a non-swelling product may be due to a plurality of effects, one of which probably is a limited amount of esterification to introduce carbamyl groups into the starch molecule without disrupting the granules. Our tests also show that the effect is mainly due to interaction taking place between the granule and the diisocyanate.

Tabulated below are the results of a series of experiments which were carried out as follows. One hundred grams of starch granules (air dry weight) was suspended in the tabulated volume of water. The pH of the suspension was then adusted as shown by the addition of 0.5 N sodium hydroxide. The diisocyanate was then added in the amount recorded in the table and the suspension stirred for the recorded period of time. The product was filtered, washed, and allowed to air dry to equilibrium. The dried product was then subjected to a standard swelling test. The test consists of adding 2 grams of our air dry modified starch, finely ground, to a 40-ml. graduated centrifuge tube. The volume of material in the tube is brought up to 40 ml. with water and the tube heated over steam with stirring for 20 minutes. The tube is then allowed to stand for 24 hours, and the point at which the starch settles is recorded. In contrast, unmodified corn, rice and potato starch, ran as controls in the series of experiments, all formed gels.

Although we prefer hexamethylene diisocyanate as the modifying agent, and the tabulated data emphasize this agent, it is to be understood that the invention is not limited thereto. The effects of the other diiscyanates are to definitely improve the resistance of the starches to swelling, pasting and gelling when reacted in an aqueous medium.

the system for a period of at least 5 minutes, removing the starch granules from the aqueous medium and drying them.

2. The method of claim 1 in which the pH of the suspension is maintained the range of 8 to 11 by the addition of a soluble alkaline agent.

3. The method of claim 2 in which contact between the aqueous medium and the starch granules is intensified by stirring.

4. Method of claim 1 in which the starch is corn starch.

5. Method of claim 1 in which the starch is rice starch.

6. Method of claim 1 in which the starch is potato starch.

7. Method of claim 1 in which the organic diisocyanate is toluene diisocyanate.

8. Method of claim 1 in which the organic diisocyanate is hexamethylene diisocyanate.

IVAN A. WOLFF.
PAUL R. WATSON.

Table I

| Expt. No. | Starch | Vol. of water ml. | pH of Suspension Beginning:End [1] | Diisocyanate ml.:kind [2] | Reaction time min. | Nitrogen introduced percent | Swelling test settled to ml. |
|---|---|---|---|---|---|---|---|
| 1 | Corn | 400 | 10.5 | 1.0 H.D. | 5 | 0.10 | 14.0 |
| 2 | Corn | 400 | 10.5  7.1 | 5.0 H.D. | 120 | 0.65 | 17.0 |
| 3 | Corn | 400 | 10.5  10.2 | 3.0 H.D. | 120 | 0.41 | 15.5 |
| 4 | Potato | 400 | 10.7  7.2 | 1.0 H.D. | 120 | 0.10 | 16.0 |
| 5 | Rice | 400 | 10.5  7.8 | 1.0 H.D. | 120 | 0.12 | 15.0 |
| 6 | Corn | 400 | 10.5  7.1 | 1.0 H.D. | 120 | 0.11 | 11.5 |
| 7 | Corn | 200 | 10.5  7.3 | 1.0 H.D. | 120 | 0.14 | 13.0 |
| 8 | Corn | 400 | 9.0  8.8 | 3.0 H.D. | 120 | 0.45 | 9.5 |
| 9 | Corn | 400 | 10.5  10.1 | 1.0 H.D. | 5 | 0.15 | 15.0 |
| 10 | Corn | 400 | 10.5  7.1 | 1.0 H.D. | 120 | 0.13 | 14.0 |
| 11 | Corn | 120 | 10.5  7.8 | 3.0 T.D. | 120 | 0.66 | 30.0 |
| 12 | Corn | 400 | 10.5 | 0.5 H.D. | 150 | 0.07 | 13.0 |
| 13 | Corn | 400 | 10.5 | 0.25 H.D. | 120 | 0.03 | 18.0 |
| 14 | Corn | 400 | 10.5 | 0.1 H.D. | 120 | 0.01 | 34.0 |
| 15 | Corn | 400 | 6.0 | 1.0 H.D. | 120 | 0.06 | 26.0 |
| 16 | Corn | 400 | 4.0  6.7 | 1.0 H.D. | 120 | 0.06 | 26.5 |
| 17 [3] | | | | | | | 25.5 |

[1] Experiments Nos. 3 and 8, NaOH was added periodically to maintain the pH.
[2] H.D. means hexamethylene diisocyanate. T.D. means toluene 2,4-diisocyanate.
[3] Commercial swell-resistant modified starch for comparison.
Note: Reactions carried out at room temperature.

We claim:

1. The method of rendering starch granules resistant to swelling which comprises suspending the granules in an aqueous medium containing 0.1 to 1.0 percent of an organic diisocyanate based on the weight of the starch, maintaining References Cited in the file of this patent

UNITED STATES PATENTS

| Number | Name | Date |
|---|---|---|
| 2,284,896 | Hanford et al. | June 2, 1942 |
| 2,374,136 | Rothrock | Apr. 17, 1945 |
| 2,562,978 | Wolff | Aug. 7, 1951 |